UNITED STATES PATENT OFFICE.

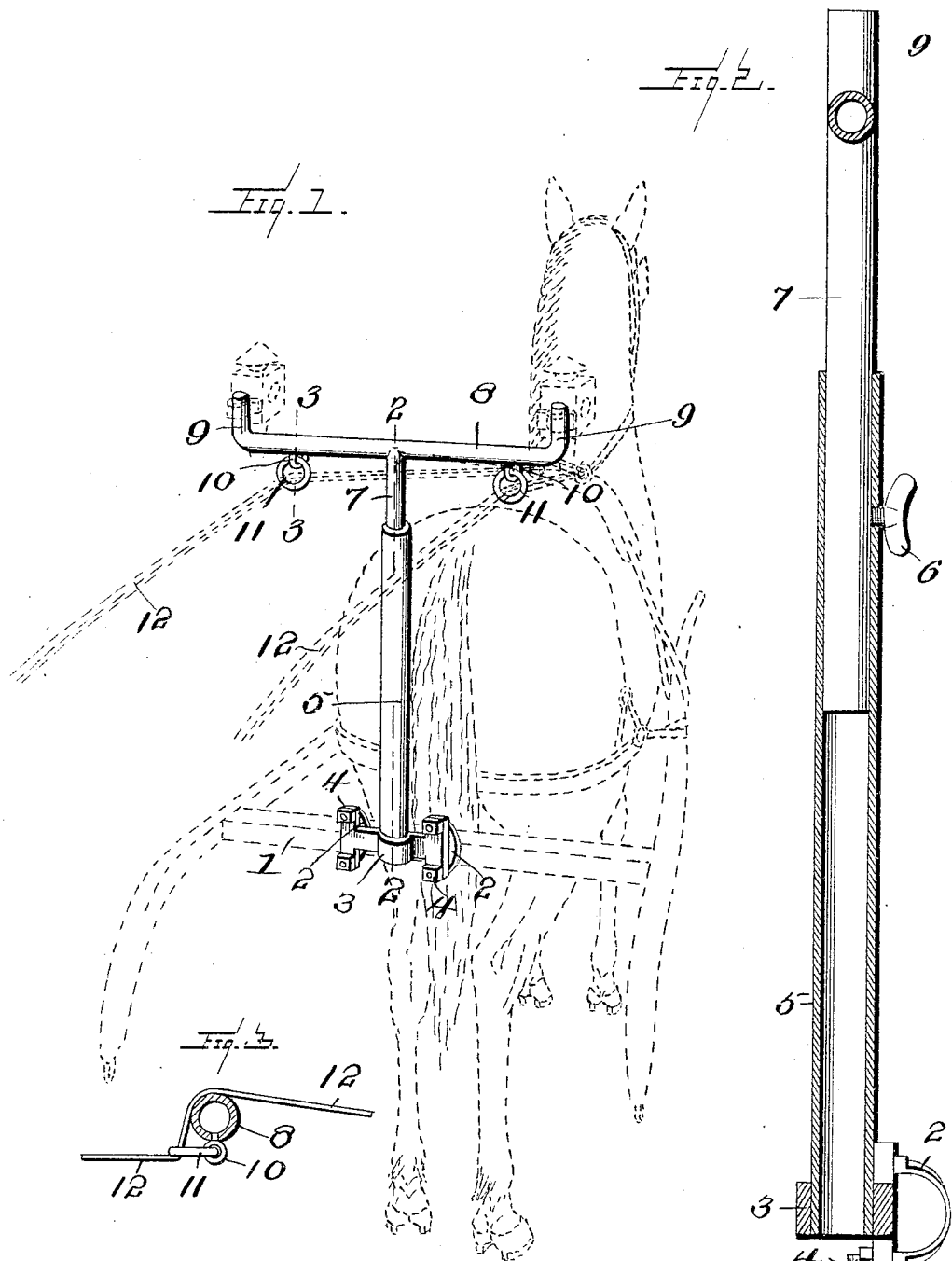

JOHN M. BETHEL AND HORACE C. PEACHEY, OF WICHITA, KANSAS.

REIN-SUPPORT.

No. 805,772.      Specification of Letters Patent.      Patented Nov. 28, 1905.

Application filed November 12, 1904. Serial No. 232,451.

*To all whom it may concern:*

Be it known that we, JOHN M. BETHEL and HORACE C. PEACHEY, citizens of the United States, residing at Wichita, in the county of Sedgwick and State of Kansas, have invented a certain new and useful Improvement in Rein-Supports, of which the following is a specification.

Our invention relates to rein-supports, and has for its object to provide a device which may be attached to a vehicle and serve to support the reins above the back of the horse and in such position as to be out of reach of the horse's tail.

A further object of our invention is to construct a rein-support which will be easily and quickly adjusted vertically to facilitate use with horses of different heights, so that the reins may not be held at a greater height than is necessary.

Another object of our invention is to construct a rein-support which will greatly assist in managing a wild or unmanageable horse.

A still further object of our invention is to provide elevated supports for carriage-lamps disposed in front of the driver and in such position as to satisfactorily light the road ahead.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the accompanying drawings, Figure 1 is a perspective view showing an improved rein-support mounted upon the cross-bar of the thills of a buggy. Fig. 2 is a vertical section on line 2 2 of Fig. 1. Fig. 3 is a detail sectional view on line 3 3, Fig. 1, showing one method of using.

Like characters of reference designate corresponding parts throughout the several views.

In the use of our improved rein-support it is mounted upon any convenient portion of a vehicle, preferably the cross-bar of the thills. We attach the device to its support by the use of clips 2 placed about the cross-bar and through holes in the base 3 and screwing nuts 4 upon the free ends of the clips, thereby exerting sufficient pressure on the clips to hold the device in a vertical position. To the middle of the base 3 is secured an upstanding tubular member 5, and near the top thereof a thumb-screw 6 is passed through one of the walls and adapted to bear upon a member 7, preferably tubular, which fits slidably within member 5. Upon the upper end of member 7, and preferably integral therewith, is formed cross-bar 8, extending horizontally upon each side of member 7 at right angles thereto. The opposite ends of bar 8 are each bent upward to a vertical position 9 to serve as brackets upon which lamps may be mounted, as shown. To the under side of bar 8 and near the ends thereof are secured eyes 10, in which are loosely hung rings 11, through which reins 12 may be passed.

In using our improved rein-support the cross-bar 8 is adjusted to the desired height by loosening screw 6 and raising or lowering member 7, within tube 5, to the desired position. The screw 6 is then tightened and the upper portions secured in position. The reins may then be passed through rings 11, as shown in Fig. 1, or they may be passed first over bar 8 and downward through ring 11, as shown in Fig. 3. The latter position is preferred when driving a fractious or unmanageable horse or one liable to stumble.

While we have shown and described the bars 7 and 8 as being formed integral, it is evident that a T-joint may be used and the member 8 made in two parts and screwed therein from opposite sides. It is also evident that the device may be secured by other means than by the form of bar shown at 3 or by the use of other device than clips 2 and that other minor changes might be made in the structure or manner of its use without departing from the spirit of our invention.

Having thus described our invention, what we claim as novel, and desire to secure by Letters Patent, is—

In a device of the character described, the combination of an adjustable upright member having horizontal arms with their extremities bent upward as shown, eyes secured to the horizontal arms near the vertical extremities, rings loosely secured in the said eyes, and a horizontally-disposed base terminating in upwardly and downwardly extending projections each provided with openings for the reception of clips and means bearing upon such projections for holding said clips securely about a suitable support, substantially as described.

JOHN M. BETHEL.
HORACE C. PEACHEY.

In presence of—
J. A. RUTH,
CYRUS SULLIVAN.